United States Patent [19]
Dang

[11] Patent Number: 5,570,337
[45] Date of Patent: Oct. 29, 1996

[54] MODULAR INDEPENDENT LIBRARIES INTERCONNECTED BY A COMMON MEDIA EXCHANGE AND INPUT APPARATUS

[75] Inventor: Chi-Hung Dang, Tucson, Ariz.

[73] Assignee: International Business Machines Corporation, Armonk, N.Y.

[21] Appl. No.: 334,898

[22] Filed: Nov. 7, 1994

[51] Int. Cl.$^6$ .................................................. G11B 15/68
[52] U.S. Cl. ........................................ 369/192; 414/277
[58] Field of Search ............................... 369/192, 34, 36; 360/92; 414/281, 277

[56] References Cited

U.S. PATENT DOCUMENTS

| 5,274,516 | 12/1993 | Kakuta et al. | 360/92 |
| 5,429,470 | 7/1995 | Nicol et al. | 360/92 |

FOREIGN PATENT DOCUMENTS

| 61-104362 | 5/1986 | Japan | 360/92 |

*Primary Examiner*—Stuart S. Levy
*Assistant Examiner*—Kevin M. Watkins
*Attorney, Agent, or Firm*—D. A. Shifrin; H. Sommermeyer

[57] ABSTRACT

A media library system has a plurality of independently-operated library arrays disposed in a side-by-side relationship along a first direction. Each of the library arrays has a media drive and a plurality of media storage receptacles arranged in a second direction that is transverse to the first direction. A separate media transport apparatus in each of the library arrays has a moveable media holder for moving media along the second direction between the storage receptacles in the library arrays and the media drives, respectively, in the independently-operated library arrays. A media exchanging and input common apparatus has a media carrier disposed for movement adjacent a common end of all of the independently-operated library arrays along the first direction. The media carrier has a media-transfer stop location at each of the library arrays at the common end of each of the library arrays. Each of the media transport apparatus moves the respective media holders to be aligned with the media carrier while the media carrier is disposed in the media-transfer stop location. The media carrier has a media input-output location that is disposed in a predetermined misalignment with all of the separate media transport apparatus. Access to the media carrier from outside the library apparatus is limited by mechanical interlocks while the media carrier is in its media input-output stop location.

2 Claims, 2 Drawing Sheets

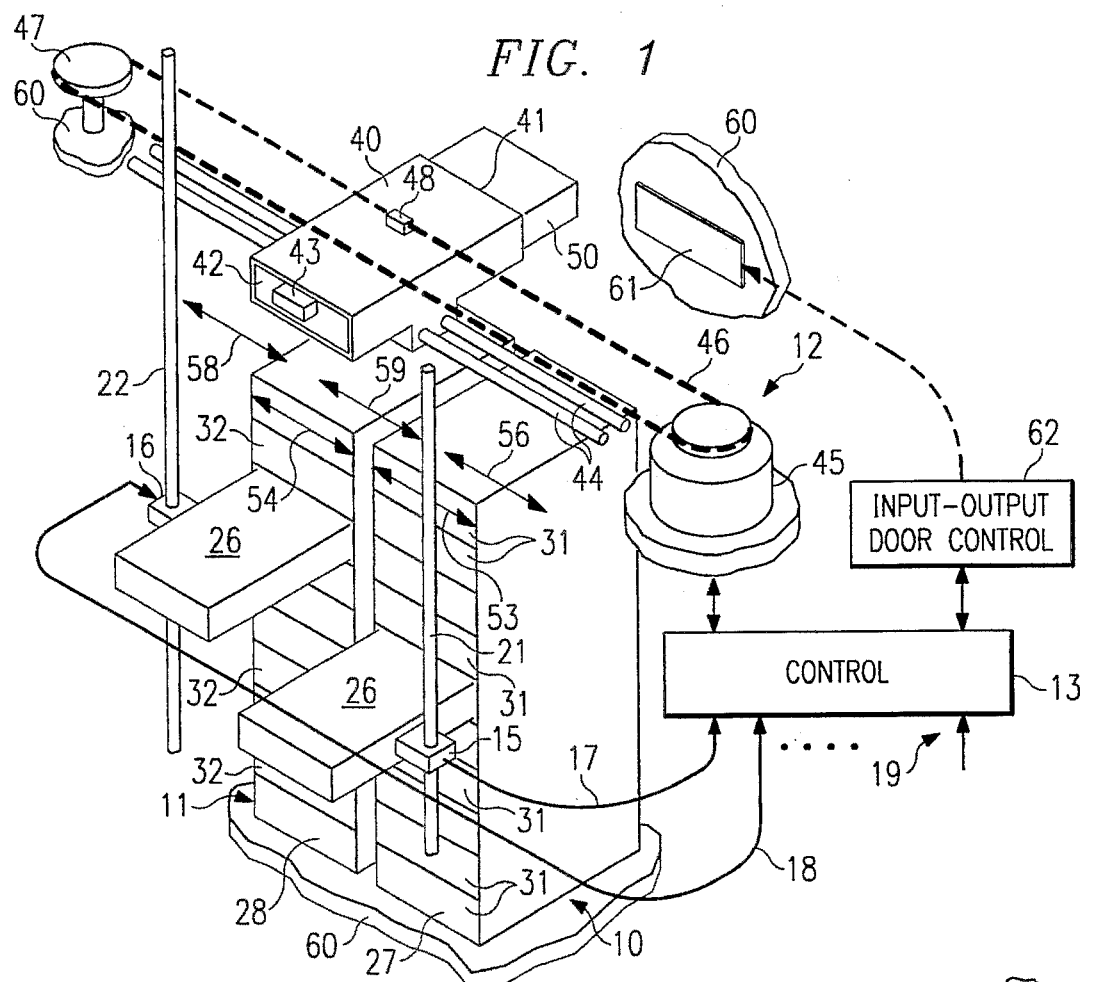
FIG. 1
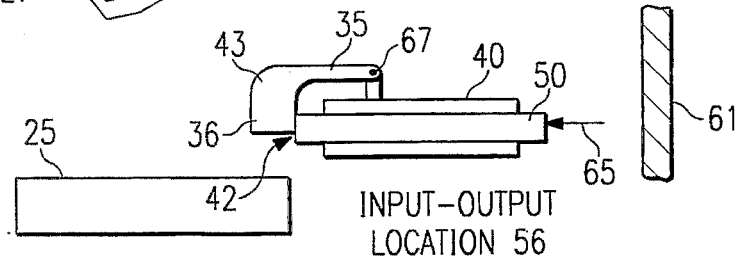
FIG. 2A  INPUT-OUTPUT LOCATION 56
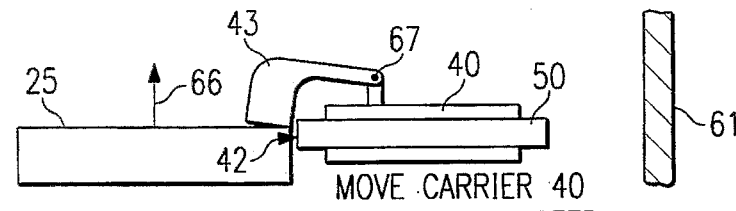
FIG. 2B  MOVE CARRIER 40 TO MEDIA TRANSFER LOCATION 53
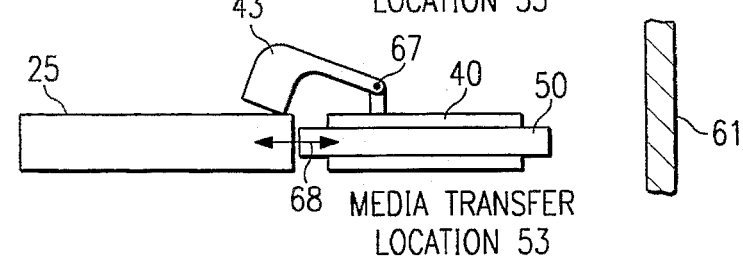
FIG. 2C  MEDIA TRANSFER LOCATION 53

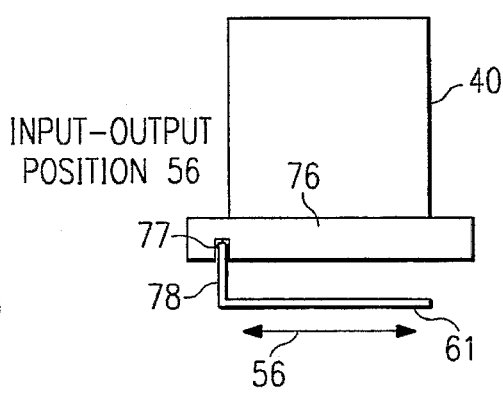
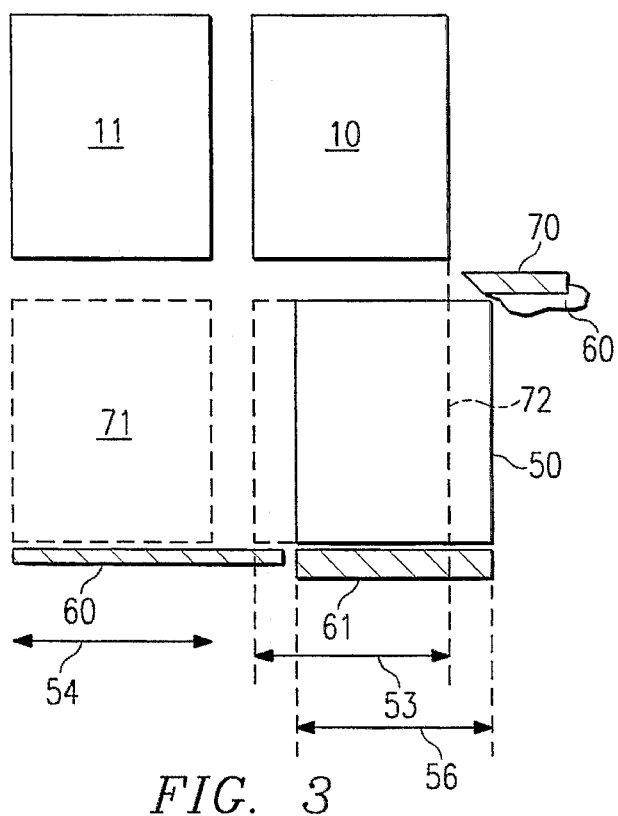
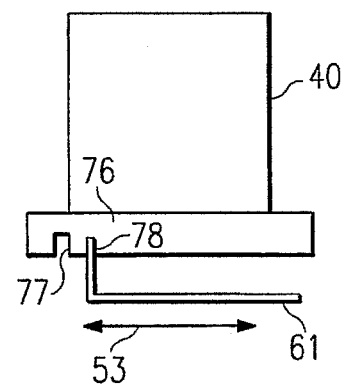
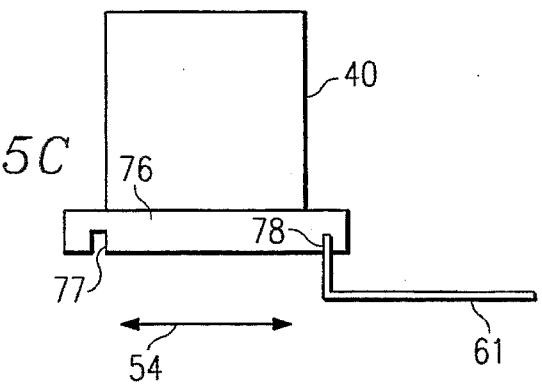
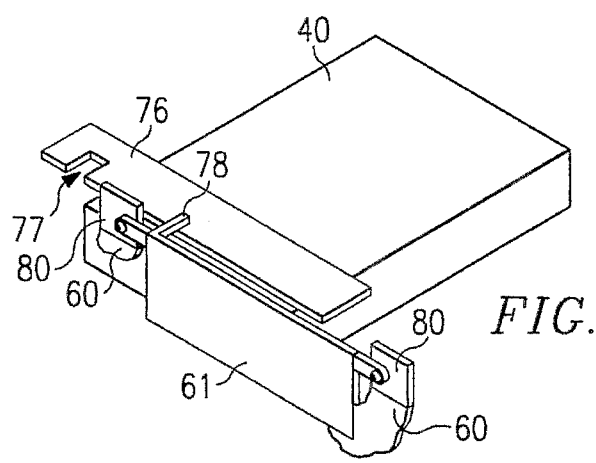

MODULAR INDEPENDENT LIBRARIES INTERCONNECTED BY A COMMON MEDIA EXCHANGE AND INPUT APPARATUS

FIELD OF THE INVENTION

This application relates to media libraries, particularly to those media libraries of simple design that can be modularly accumulated using a media exchanging and input apparatus.

BACKGROUND OF THE INVENTION

Record media libraries have been used for many years. Such media libraries have often been relatively large machines. These large machine media libraries are constructed by assembling a plurality of sub-assembly cabinets together. Media transporting means in these media libraries could access media storage receptacles in any sub-assembly cabinet as well as media drives commonly incorporated into a usual array of media storage receptacles. Such media libraries require complex installation, possible negative performance characteristics while not necessarily being cost effective. It is desired to remove the installation complexity of large capacity media libraries by providing a plurality of independent media libraries. Further, means are desired to facilitate some automatic internal migration of media between the plurality of independent media libraries.

Various types of record media have been used in such large media libraries. Magnetic tape was a first medium use in such libraries. Magnetic cards, micro-fiche cards and now optical disks have been and are also used in media libraries. Some media libraries have a capability of storing diverse media. The present invention enables a facile and low-cost implementation of a multi-media library system.

DISCUSSION OF PRIOR ART

Kulakowski et al in U.S. Pat. No. 5,303,214 show a large-scale multi-media library consisting of an assembly of cabinets serviced by a media transport system having direct access to all media storage receptacles in the library. Media drives, for respective media types, are disposed in the storage arrays of the illustrated library.

Camras in U.S. Pat. No. 3,134,550 shows an early magnetic tape library apparatus having single-reels of tape. An overhead crane carries magazines of tape reels to a tape buffering carousel. A media drive accesses the carousel to fetch and return the spools of tape. The media drive has an automatic load-unload mechanism.

Polus et al in U.S. Pat. No. 3,715,040 show a tape drive disposed outside of and remote from an automatic tape library. Two-spool tape cartridges are transported between the tape library and the tape drive. It is desired to avoid the illustrated remoteness of the media drive from the media library.

Nonaka et al in U.S. Pat. No. 4,772,968 show a video tape library having facing open-sided storage array walls with a video player at one end of the media library. The transport mechanism can carry two video cassettes.

Munro in U.S. Pat. No. 4,864,438 show a plurality of cylindrical media storage arrays with means for transporting media between the arrays. It is desired to provide a simpler media library arrangement and one that enables multi-media type storage.

Larson et al in the IBM Technical Disclosure Bulletin, Vol. 15, No. 4, September, 1972, pp. 1202–1203 in the article RANDOM-ACCESS RECORD STORAGE show a plurality of one-half inch tape libraries, a plurality of banks of tape processing stations (media drives), media buffer storage and means for transporting media between the above-listed apparatus. The tape processing stations are disposed remote from the tape libraries and from the tape buffer storage. It is desired to provide a more compact media library arrangement.

IBM Technical Disclosure Bulletin, Vol. 36, No. 8, August, 1992 on pages 495–6 shows a tape cartridge library arrangement having diverse configurations. A table shows suggested configurations. A plurality of columns of drives and cartridges are accessed by either two-column or one-column picker or access assemblies. So-called cartridge passers are provided between some of the two-column arrangements. Some of the pickers are capable of transporting two tape cartridges. The picker assemblies are the so-called pass-through pickers.

Cumulative to the above discussion, U.S. Pat. Nos. 5,022,019; 4,903,252 and 4,937,690 are cited for showing multi-column media storage libraries.

SUMMARY OF THE INVENTION

The present invention provides for a plurality of independent media libraries of the columnar type that are interconnected by a media carrier system that provides for media input-output and exchange between any of the independent libraries.

In accordance with the invention, a plurality of library arrays are disposed in a side-by-side relationship along a first direction. Each of said library arrays has a media drive and a plurality of media storage receptacles arranged in a second direction that is transverse to said first direction. A separate media transport apparatus operates independently in each of said library arrays. Each media transport apparatus has a media holder for moving media along said second direction between said storage receptacles in said library arrays and said media drives, respectively. A media exchanging and input-output apparatus has a media carrier disposed for movement adjacent a common end of all of said library arrays in said first direction. The media exchanging and input-output apparatus has a media-transfer stop location at each of said library arrays at said common end of each of said library arrays. At each stop location, media can be transferred between the media carrier and one of said media transport apparatus holders. Each said media transport apparatus can move the respective media holders to be aligned with said media carrier while said media carrier is disposed in a predetermined alignment with said library arrays for transferring said media between said carrier and said media holders, respectively. The media carrier also has an input-output stop location that is disposed in a predetermined misalignment with all of said separate media transport apparatus.

The foregoing and other objects, features and advantages of the invention will be apparent from the following more particular description of preferred embodiments of the invention, as illustrated in the accompanying drawings.

DESCRIPTION OF THE DRAWING

FIG. 1 illustrates a library arrangement employing the present invention.

FIGS. 2A through 2C show three relative positions of a library media holder and an exchange carrier of the FIG. 1 illustrated apparatus for enabling media transfer between the carrier and holder.

FIG. 3 is a diagrammatic plan view of an alternate input-output interlock to the illustrated interlock in FIGS. 2A–2C.

FIGS. 4 and 5A–5C show an interlocking input-output door control used in the FIG. 1 illustrated apparatus.

DETAILED DESCRIPTION

Referring now more particularly to the appended drawing, like numerals indicate like parts and structural features in the various figures. As best seen in FIG. 1, first and second media library arrays 10 and 11 are independently operated. Media exchanging and input-output common apparatus 12 provides for transferring media between library arrays 10 and 11 and for providing media input to the arrays and output from the arrays. Inspection of FIG. 1 shows that additional independent library arrays may be added and only the common apparatus and cabinets need be changed. Such a modularity comes at a relative low cost. Programmed electronic control 13 controls the arrays 10 and 11 and common apparatus 12. First and second media transport apparatus 15 and 16 respectively transport media between first and second sets of media storage receptacles 31 and 32 with media devices 27 and 28, respectively in the two library arrays. Electrical connections 17 and 18 respectively connect first and second media transport apparatus to control 13. Control 13 commands the transport apparatus to fetch and store media in a known manner, each library array 10 and 11 being independently controlled. Media holders 25 and 26, respectively in library arrays 10 and 11, are movably mounted respectively on vertical poles 21 and 22 for carrying media in a known manner between the media storage receptacles and media drives. Since additional library arrays (not shown) may be added, control 13 has additional connections 19 for accommodating any additional library arrays.

Common apparatus 12 includes a rectangularly-shaped tube or shell media carrier 40 movably disposed for motion in a first direction (along the lengths of support rails 44) across a common end of the library arrays 10 and 11. Media carrier 40 has an input-output or external port 41 for yielding and receiving media externally from the illustrated apparatus. In the illustrated embodiment, the media input-output is manual. Automatic or semi-automatic input-output may be provided. Internal media transfer port 42 opens to media transport apparatus 15 and 16, as will become better understood. Media retainer 43 blocks internal port or opening 42 to prevent externally inserted media container 50 from leaving carrier 40. As later described with respect to FIGS. 2A–2C, media retainer 43 is automatically displaced for unblocking opening 42 to enable transfer of media container 50 to and from an aligned one of the media holders 25 or 26. Media carrier 40 is movably mounted on a pair of rails 44 that extend across the common end of library arrays 10 and 11. Motor 42 is selectively actuated by control 13 in a usual manner for driving drive belt 46 to move carrier 40 in a first direction via fixed belt attachment 48. Idler pulley 47, mounted for rotation on cabinet 60 (only partially shown) enclosing all of the illustrated apparatus, tensions drive belt 46.

Any type of media may be used in practicing the present invention. For example, in an early embodiment, optical disks are the media. Media container 50 removably held four optical disks. Transport apparatus 15 and 16 carried the media container with up to four optical disks. Media devices 27 and 28 selected an optical disk from a container delivered to the respective media device in a known manner for recording and playback. By way of example, such a media drive is illustrated in the IBM Technical Disclosure Bulletin, Vol. 37, No. 9, September, 1994 in pages 251 through 253. Media container 50 may take any one of many forms, such as cassette, cartridge, plastic encapsulation of a recording layer and the like. Magnetic tape, card or sheet media and magnetic disks may be employed. By making media carrier 40 accommodate plural media container types, each library array 10 and 11 can employ a different media type. It is preferred that one media type be used.

The internal media-transfer stop positions of carrier 40 are represented in FIG. 1 by double-headed arrows 53 and 54, respectively, for library arrays 10 and 11. All media carrier stop locations are effected by usual positioning control provided by control 13. Alternately, detents may be provided for mechanically indicating the described stop locations. Support poles 21 and 22 extend vertically such that media holders 25 and 26 are moveable to be aligned with media carrier 40 in the respective stop locations 53 and 54.

Media input-output is via door 61 mounted in cabinet 60. The diverse references in the drawing to cabinet 60 are intended to illustrate that cabinet 60 encloses library arrays 10 and 11 plus the common apparatus 12. Door 61 is aligned with carrier 40 input-output stop location shown by double-headed arrow 56. The input-output stop location is misaligned with holders 25 and 26 such that no media transfer is possible between the holders and carrier 40. A preferred misalignment is an overlapping of the input-output stop location with one or more of the media-transfer stop locations as shown in FIG. 1. The term misalignment includes input-output stop location being remote from any of the media-transfer stop locations, i.e. remote from library arrays 10 and 11. As later explained, door 61 is interlocked such that it is opened only when carrier 40 is at the media input-output stop location 56. Further, input-output door control 62 may be added such that control 13 keeps door 61 latched against opening until control 13 detects that media carrier 40 is in the input-output stop location 56. Alternate or additional media carrier 40 input-output stop locations 58 and 59 can be provided. Such input-output stop locations are disposed between adjacent ones of the library arrays 10 and 11. For such additional input-output stop locations, the main requirement is that the input-output stop locations are not aligned with any of the media-transfer stop locations 53 and 54.

FIGS. 2A through 2C illustrate aligning media holder 25 with media carrier 40 for media transfer. FIG. 2A assumes that media carrier 40 has been moved to media-transfer stop location 53. Arrow 65 indicates that media container 50 has been manually inserted into media carrier 40 via door 61 (also see FIGS. 4 and 5A through 5C). Media retainer 43 having two right-angled arms 35 and 36, a media container 50 engaging depending arm 36 cannot pivot media retainer 43 upwardly as later described in FIGS. 2B and 2C. As media holder 25 of transport apparatus 15 is approaching alignment with media carrier 40, media retainer 43, pivotally mounted on media carrier 40 by pin 67, is in its media blocking position (gravity actuated to move to this position) with its depending arm 36 at opening 42. Note that insertion of container 50 into media carrier 40 will not pivot media stop upwardly. FIG. 2B shows media holder 25 engaging media retainer 43 for pivoting media retainer 43 upwardly away from internal media port 42. FIG. 2C illustrates media holder 25 aligned with media carrier 40. Media retainer 43 is fully pivoted upwardly. A picker (not separately shown, each holder 25 and 26 has one picker), picks media container 50 for moving container 50 from media carrier 40 into media holder 25 as indicated by double-headed arrow 68. Outputting media from either library array 10 or 11 is a reverse procedure of the described input sequence of steps.

FIG. 3 illustrates a simpler mechanical interlock than shown in FIGS. 2A through 2C. Library arrays 10 and 11 are represented by the two rectangles. Dashed line box 71 represents position of media carrier 40 in the media-transfer stop location 54. Dashed line box 72 represents the location of media carrier 40 in the media-transfer stop location 53. Fixed media stop 70 extends into the carrier 40 media input-output stop location 56 but is short of media-transfer stop location 53. Insertion of media container 50 through door 61 (see FIGS. 4 through 5C) results in media container 50 being retained in media carrier 40 by detents (not shown). The media carrier 40 movement to media-transfer stop locations 53 and 54 enable media container 50 transfers between the media holders 25 and 26 with media carrier 40.

The door 61 mechanical interlock is next described. Media carrier 40 has slotted interlock plate 76 cantilevered toward door 61. Door 61 is pivotally mounted on cabinet 60 by pivot bosses 80. Slot 77 in interlock plate 76 enables door 61 to be pivoted upwardly by allowing interlock rod 78 on door 61 to move downwardly. FIG. 5A shows media carrier in the input-output stop location 56 wherein interlock rod 78 is aligned with slot 77. In this location, a media container 50 may be either inserted into or removed from media carrier 40 through the opening usually closed by door 61. FIG. 5B shows media carrier 40 in its media-transfer stop location 53 whereat door 61 cannot be opened. FIG. 5C shows media carrier 50 in its media-transfer stop location 54 whereat door 61 cannot be opened.

While the invention has been particularly shown and described with reference to preferred embodiments thereof, it will be understood by those skilled in the art that various changes in form and details may be made therein without departing from the spirit and scope of the invention.

What is claimed is:

1. A media library system, including in combination:

a plurality of library arrays disposed in a side-by-side relationship along a first direction for storing a plurality of media containers;

each of said library arrays having a media drive and a plurality of media storage receptacles arranged in a second direction that is transverse to said first direction;

a separate media transport apparatus in each of said library arrays having a media holder for moving media along said second direction between said storage receptacles in said library arrays and said media drives, respectively;

a media exchanging and input-output apparatus having a media carrier disposed for movement adjacent a common end of all of said library arrays along said first direction and having a media-transfer stop location at each of said library arrays at media-transfer stop location at each of said library arrays at said common end of each of said library arrays;

each of said media transport apparatus moving said respective media holders to be aligned with said media carrier while said media carrier is disposed in a predetermined alignment with said library arrays for transferring said media between said carrier and said media holders, respectively;

said media carrier having an input-output location that is disposed in a predetermined misalignment with all of said separate media transport apparatus;

said media carrier comprising a rectangular tube having a first opening facing said library arrays and a second opening facing away from said library arrays;

an L-shaped media retainer having first and second substantially perpendicular arms, said first arm having a pivot mount on one distal end;

mounting means on a top wall of said media carrier connected to said pivot mount for pivotally mounting said media retainer on said media carrier such that said second arm is gravity urged to be in front of said first opening;

said first arm extending substantially parallel to said top wall while said second arm is disposed in front of said first opening whereby insertion of a media container through said second opening is stopped by said second arm without pivoting said media retainer upwardly; and said input-output stop location overlapping along said first direction a predetermined one of said media-transfer stop locations;

said media exchanging and input-output apparatus comprising:

longitudinal-extending support means movably supporting said media carrier for movements along said first direction in juxtaposition to said common ends of said library arrays;

motive means stationarily disposed adjacent a first end of said longitudinal-extending support means;

idler means stationarily disposed adjacent a second end of said longitudinal-extending support means, said second end being an opposite end to said first end of said longitudinal-extending support means;

a belt extending between said motive means and said idler means and having a fixed attachment to said media carrier for moving said media carrier in reciprocating motions along said first direction;

said media exchanging and input-output apparatus having first and second media transfer stop locations for said media carrier respectively aligned with said library arrays for enabling said media transport apparatus in each of said library arrays to access said media carrier for exchanging said media container with said media carrier;

said common apparatus having an input-output stop location along said first direction disposed in a predetermined misalignment along said first direction with said; and external access apparatus disposed at said input-output stop location for enabling access to said media carrier externally of said system;

cabinet means enclosing said library arrays and said media exchanging input-output apparatus;

said external access apparatus comprising a door pivotally mounted on said cabinet means for vertical pivoting motions for closing an access opening in said cabinet means while pivoted to a vertical position at said media input-output stop location;

an access control rod on an upper portion of said door and extending inwardly into said media input-output stop location;

said media carrier having an interlock plate longitudinally extending along said first direction and extending toward said cabinet means, said interlock plate having a slot for receiving said access control rod while said media carrier is at said media input-output stop location for permitting said door to pivot away from said vertical position for enabling access to said media carrier via said second opening and said access opening in said cabinet means and said interlock plate engaging said access control rod while said media carrier is away from said media input-output stop location.

2. The system set forth in claim 1, further including in combination:

said media carrier comprising a rectangular tube having a first opening at a first longitudinal end facing said library arrays and a second opening at a second longitudinal end opposite to said first longitudinal end and facing away from said library arrays;

a fixed stop extending into said media input-output stop location immediately adjacent along said first direction one of said library arrays, said fixed stop having a media engaging surface facing said door and disposed in a predetermined alignment with said first longitudinal end of said media carrier for limiting movement of said media container inserted through said second opening from passing through said first opening while said media carrier is at said media input-output stop location.

\* \* \* \* \*